(No Model.)

J. MIDDAUGH & C. M. WILCOX.
PORTABLE FENCE MACHINE.

No. 347,190. Patented Aug. 10, 1886.

Attest
Stratton Sims
J. Simpson Roebuck Jr.

Inventors
Jacob Middaugh
Charles M Wilcox
by Wood & Boyd their Attys

UNITED STATES PATENT OFFICE.

JACOB MIDDAUGH AND CHARLES M. WILCOX, OF NEW PARIS, OHIO.

PORTABLE FENCE-MACHINE.

SPECIFICATION forming part of Letters Patent No. 347,190, dated August 10, 1886.

Application filed April 17, 1886. Serial No. 199,234. (No model.)

*To all whom it may concern:*

Be it known that we, JACOB MIDDAUGH and CHARLES M. WILCOX, of New Paris, in the county of Preble and State of Ohio, have invented certain new and useful Improvements in Portable Fence-Machines, of which the following is a specification.

Figure 3:
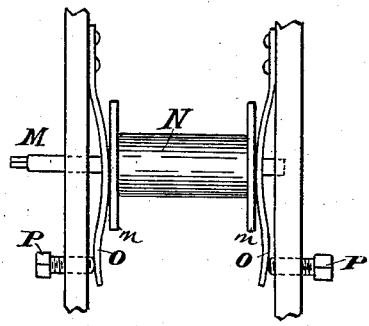
Figure 4:
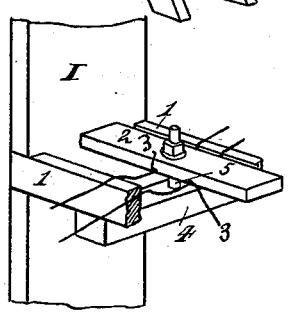

Our invention relates to that class of fencing-machines which twist wires around slats or pickets to form the fence in the vertical position in which the fence is used, which are sometimes termed "vertical fencing-machines." To build this class of fence it is desirable to have the couplets or each of the two parallel wires stretched taut, one couplet vertically above the other, and running a considerable distance from the commencing-post, to which the ends of the couplets of wires are firmly fixed. It is also desirable to hold taut the couplets of wires which are to be twisted to hold the slats, and yet allow the wires to yield automatically in response to the strain of the twister. In order to secure uniformity of tautness of each couplet of wire, it is desirable to provide independent straining and gripping devices for each wire or each couplet. It is also desirable to have the straining and tension and wire-delivering devices attached to or supported by a portable frame independent in its adjustments of the loom or twisting-machine, so that when it is desired to build a line of fence the wires may be properly stretched and adjusted to the tension and anchoring-frame, and the twisters operated to twist the wires around the slats or pickets without disturbing the adjustment of the tension devices. These functions we accomplish by the improvements set forth in the accompanying drawings and specification, in which—
Figure 1 of the drawings represents our improvements in position for use. Fig. 2 represents a modification of the wire-supporting reels; Fig. 3, another modification of the wire supporting and tension reels. Fig. 4 represents a perspective view of the pressure tension-plate.

A represents a fixed post and, say, the starting-point of a line of fence.

B represents slats, which are secured between the twisted couplets of wires C.

D represents a vertical frame, on which are mounted a series of twisting-spindles, E, driven by a crank and pinions, F G G, which are usually called the "twisting-loom," and may be of any ordinary form of construction.

H represents a stop at the bottom for gaging the position of the palings when grasped by the wires.

I represents a vertical frame, on which is supported one form of our tension devices.

J represents an extension of said frame, on which are supported the wire reels or spools K.

L represents a ratchet-wheel, and *m* a pawl engaging with the teeth thereof for locking the same in position.

Figure 1:
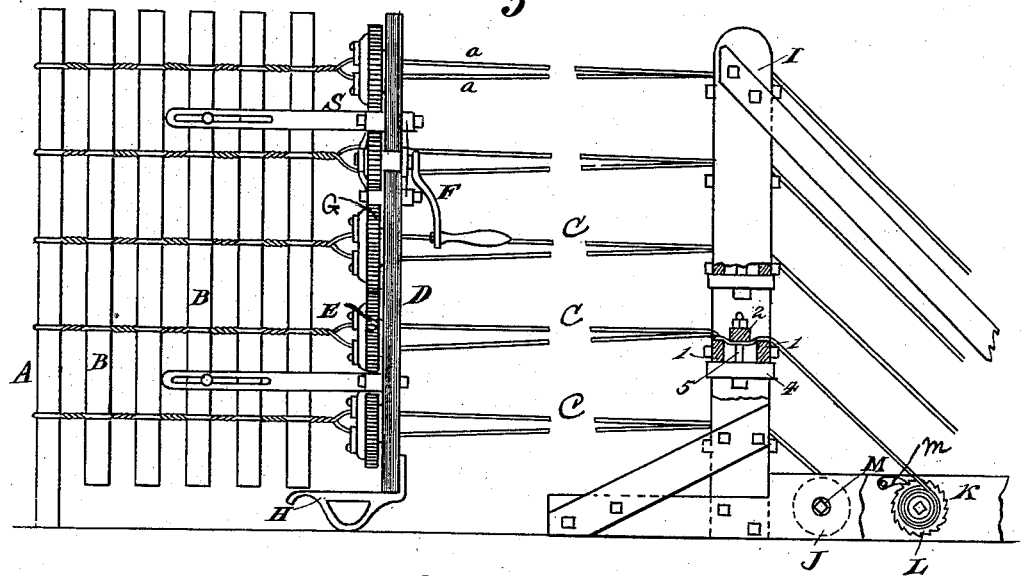
Figure 2:
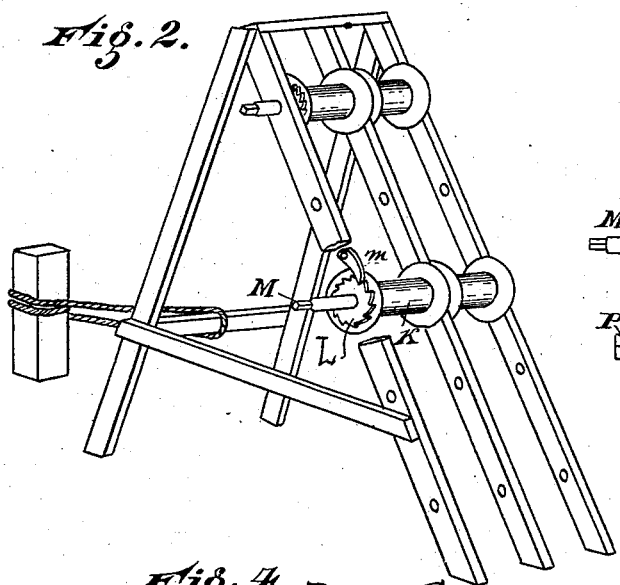

In Fig. 2 we have shown a modified form of said frame, which is of A shape, the spools K being similarly constructed to those shown in Fig. 1. We have shown two spools side by side, one for each of the wires forming the couplet, and each of these spools is mounted on a separate shaft, M, the end of which is squared, so that it can be turned by a wrench applied thereto to tighten the wires individually. The pawl *m* may be applied to hold the wires in a taut position.

In Fig. 1 the wires are shown as passing from the spools K through the tension device, constructed as follows: 1 1 represent a saddle or bridge, over which the wires are passed. 2 represents a pressure-plate. It is preferably provided with grooves 3 3, so as to hold the wires apart. 4 represents a cross-head or yoke, on which the saddle-pieces 1 are supported. 5 represents a bolt passing through said yoke 4 and through the pressure-plate 2. It is provided with a nut for depressing the pressure-plate and giving tension-strain upon the wire depressed thereby. By means of this pressure-plate any amount of tension may be applied to the couplet of wires *a a*, which are to be drawn evenly and uniformly through the tension devices by means of the twisting-spindle E. We have shown a tension device for each couplet of wires, and a spool for each wire strand, so that the series of wires which support the pickets or slats may be fed uniformly, and individually stretched and adjusted before commencing the operation of twisting the wires around the slats.

In Fig. 3 we have shown another modification, which represents the tension device as combined with the wire reels or spools. N represents the wire-spools; n n, the disks of the spools; M, the shafts on which the spools are mounted; O, tension-springs bearing against the ends of the spools. P represents adjusting-screws, upon the points of which the springs O rest. These screws are turned up to apply pressure against the ends of the reel, and thereby make a frictional resistance to the unwinding of the wire on the spool. Instead of these springs, however, brake-levers or other equivalent devices can be applied for retarding the unwinding of the spool. This resistance to the unwinding of said spool must be sufficient to hold the wires a a taut, and yet it must not be so great as to prevent the feeding of the wires up automatically by the strain of the twisters E as they are driven to twist the wires around the slats or pickets.

We do not wish to limit ourselves to the peculiar features of the tension devices, as these may be variously modified without departing from the principal features of our invention.

The machine is operated as follows: The wires are attached to and stretched from post A through the twisting-spindles E, thence through the tension devices, and around the spools or reels which support the wires. The wires are then drawn taut, either by turning the shaft M or other suitable means, and the tension is adjusted so as to normally hold the wires in a taut position, and yet allow them to yield in response to the strain of the twisting devices. After wires have been tautened by means of the ratchet-spools, and the tension devices adjusted so as to hold said wires in a taut position, the pawls m, which have been previously engaged with the ratchets, will be disengaged therefrom, in order to allow the wires to be delivered gradually and automatically in response to the strain of the twisting devices. The picket or slat is placed between the two wires. Crank F is turned to drive the series of twisters one or more times around, when the machine is adjusted and the second slat placed in position and the crank reversed, and the wires crossed or twisted in the opposite direction. This is continued until the loom has been adjusted backward to near the point where the tension-frame is anchored, when this frame is moved to a new position and suitably anchored, the wires adjusted to the proper tautness and tension, and the operation of twisting in the slats again resumed.

By means of this portable wire-stretching and adjusting tension-frame a very long line of fence can be woven with but one locating and adjusting of the tension-frame and accompanying devices.

It is obvious that the wire supporting and tension reel N shown in Fig. 3 can be employed in lieu of the tension-plate and ratchet-reel shown in Fig. 1; or, if the ratchet-reels are preferred, they may be arranged in a separate supporting-frame, Fig. 2, independent of the frame or standard that supports the tension-plates.

We claim—

1. In a vertical wire-and-slat-fencing machine, the combination of a vertical portable loom with a tension device for retarding the motion of the wires and one or more spools or reels for supporting the wires and delivering them automatically in response to the strain of the twister, substantially as specified.

2. In a vertical wire-and-slat-fencing machine, the combination of a vertical and portable twisting-loom with a tension device for each couplet of wires and one or more spools for supporting the wires and delivering them automatically by the strain of the twister, substantially as specified.

3. A vertical wire-and-slat-fencing machine consisting of a portable vertical wire-twisting loom, combined with one or more wire supporting and tension devices mounted upon a separate frame and adapted to hold the wires taut and deliver them to the loom automatically by the strain from the driven twisters, substantially as specified.

4. In combination with a vertical and portable wire-twisting loom, a tension and wire-holding device supported upon a separate frame, the wire-holders being adapted to separately strain each of said wires and the tension device to hold them in couplets, substantially as specified.

5. A vertical wire-and-slat-fence machine composed of a vertical series of wire-twisters mounted in a portable frame, and a wire tension and delivering device attached to a separate portable frame and adapted to hold, twist, and deliver wires stretched from the fixed post through the twisters to the tension device, substantially as specified.

6. In a vertical wire-and-slat-fencing machine comprising a vertical portable twisting-loom and one or more couplet-tension devices, a separate wire-holding spool for independent stretching of said wires, substantially as specified.

7. In a vertical wire-and-slat-fencing machine, the combination of a vertical and longitudinally-adjustable twisting-loom, a series of couplet-wire-tension devices attached to a separate adjustable frame, and the tension spool or spools frictionally retarded from unwinding, to hold the couplets of wire taut, and allow them to be delivered by the strain of the twisters in a taut condition, substantially as specified.

8. In a tension device for feeding wires to one or more twisters, the reels or spools by which the wires are stretched taut from a fixed or starting post through the twisters, and subsequently delivered to the twister as the palings are inserted, substantially as specified.

9. In a portable fencing-machine, a tension device supplied with one or more reels or spools, by means of which the wires may be drawn taut and then delivered through the tension device to the twisters, substantially as specified.

In testimony whereof we have hereunto set our hands.

JACOB MIDDAUGH.
CHARLES M. WILCOX.

Witnesses:
R. E. RICHEY,
L. W. RICHEY.